(12) United States Patent
Korger et al.

(10) Patent No.: US 6,999,542 B1
(45) Date of Patent: Feb. 14, 2006

(54) DATA READY INDICATOR BETWEEN DIFFERENT CLOCK DOMAINS

(75) Inventors: Peter Korger, Frederick, CO (US); Robert W. Moss, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 697 days.

(21) Appl. No.: 10/007,245

(22) Filed: Oct. 22, 2001

(51) Int. Cl.
  *H04L 7/00* (2006.01)
(52) U.S. Cl. ...................................... 375/354
(58) Field of Classification Search ............... 375/354, 375/355, 106; 327/100, 141; 709/230, 237, 709/248
See application file for complete search history.

(56) References Cited

U.S. PATENT DOCUMENTS

| | | | |
|---|---|---|---|
| 6,000,037 A | 12/1999 | Herbert | 713/400 |
| 6,033,441 A | 3/2000 | Herbert | 769/400 |
| 6,247,082 B1 | 6/2001 | Lo et al. | 710/105 |
| 2002/0181631 A1 * | 12/2002 | Mackey et al. | 375/354 |

* cited by examiner

*Primary Examiner*—Mohammed Ghayour
*Assistant Examiner*—Krista Flanagan
(74) *Attorney, Agent, or Firm*—Christopher P. Maiorana PC

(57) ABSTRACT

An apparatus including a first circuit and a second circuit. The first circuit may be configured to present a first data signal and a first indicator signal in response to a first clock signal and an enable signal. The second circuit may be configured to present a second data signal and a second indicator signal in response to the first data signal, the first indicator signal and a second clock signal.

21 Claims, 3 Drawing Sheets

DATA READY INDICATOR BETWEEN DIFFERENT CLOCK DOMAINS

FIELD OF THE INVENTION

The present invention relates to a method and/or architecture for implementing data ready indicators generally and, more particularly, to a method and/or architecture for implementing data ready indicators from one clock domain to another clock domain.

BACKGROUND OF THE INVENTION

Two or more interconnected electronic systems (or subsystems) that transfer data from one system or subsystem to the other can have two clock domains (i.e., a first clock signal CLKA domain and a second clock signal CLKB domain) that operate at the same frequency (i.e., the signals CLKA and CLKB have a common base clock). However, the clock signals CLKA and CLKB do not necessarily operate in phase with each other and the data must be synchronized. Furthermore, since the clock signal CLKA is also gated via an enable signal, the clock signal CLKA is not toggling new data into the first system (or subsystem) for every cycle of the signal CLKA. The first system generates an indicator signal when data is ready for transfer to the second system. The second system (or subsystem) presents an indicator signal when data has been transferred from the first clock domain (the CLKA domain) to the second clock domain (the CLKB domain) and the transferred data is synchronized and ready for further processing.

One conventional method for providing the data transfer and the data ready indicator signals is via handshaking with request and acknowledge signals. The CLKA domain asserts the request signal. When the CLKB domain has received a valid data transfer, the CLKB domain asserts the acknowledge signal and the acknowledge signal clears the request signal in the CLKA domain. However, handshaking with request and acknowledge signals has tight timing constraints and is not conducive to static timing analysis (STA). Another disadvantage of such a method is that it reduces bandwidth and increases latency.

Another conventional method for providing the data transfer and the data ready indicator signals is to implement a common enable signal for both the CLKA and the CLKB domains. However, since the enable signal is generated external to the CLKA and CLKB domains, the timing of the enable signal is critical.

It would be desirable to have an architecture and/or method for implementing data transfer and data ready indicators from one clock domain to another clock domain that (i) reduces and/or eliminates timing criticality, and/or (ii) is conducive to static timing analysis.

SUMMARY OF THE INVENTION

The present invention concerns a first circuit and a second circuit. The first circuit may be configured to present a first data signal and a first indicator signal in response to a first clock signal and an enable signal. The second circuit may be configured to present a second data signal and a second indicator signal in response to the first data signal, the first indicator signal and a second clock signal.

The objects, features and advantages of the present invention include providing a method and/or architecture for implementing data ready indicators from one clock domain to another clock domain that may (i) reduce and/or eliminate timing criticality, (ii) be conducive to static timing analysis, (iii) eliminate asynchronous clearing in one and/or both clock domains, (iv) transfer signals directly from one clock domain to another clock domain, (v) eliminate the requirement for an external enable signal in one of the domains, (vi) be implemented without added latency, and/or (vii) reduce the number of system specifications required.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
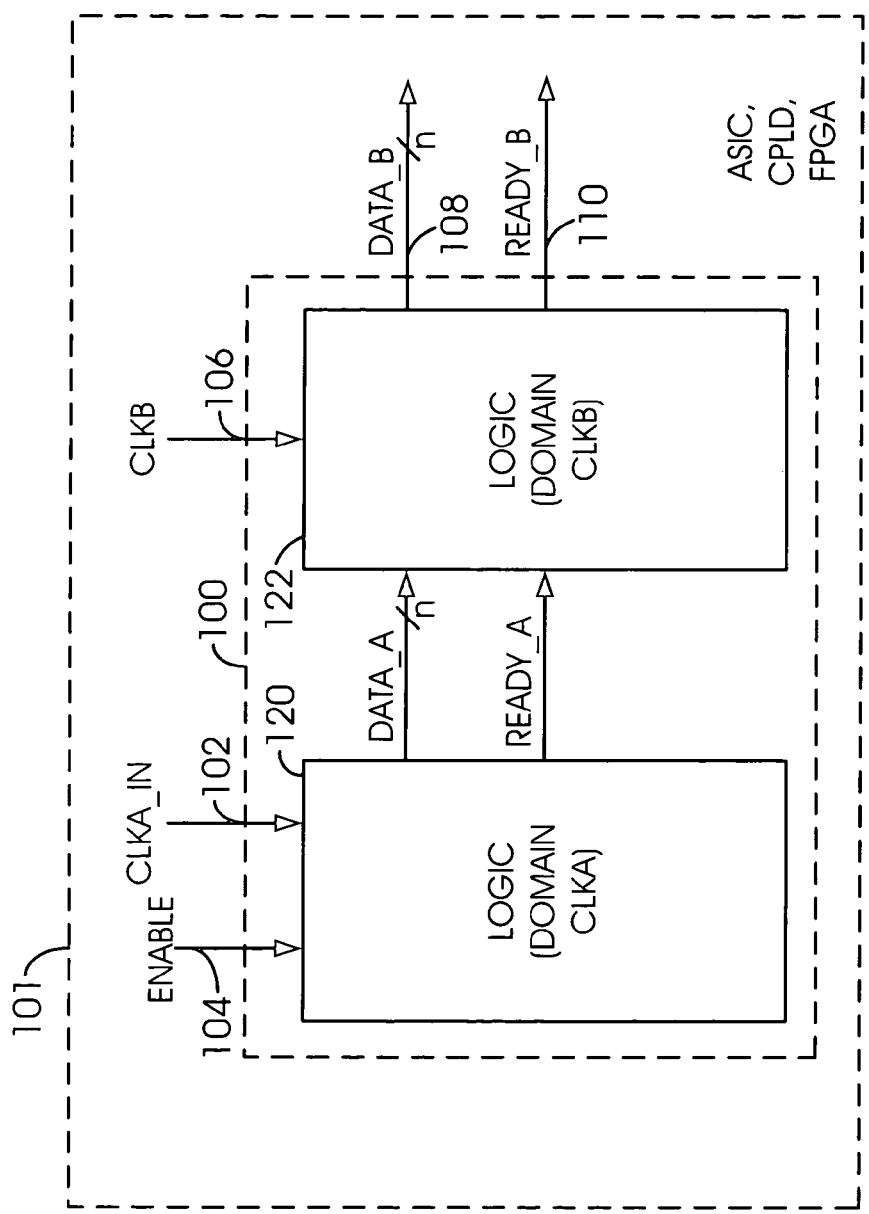
FIG. 1 is a block diagram of a preferred embodiment of the present invention.

Referring to FIG. 1, a block diagram of a circuit 100 is shown in accordance with a preferred embodiment of the present invention. The circuit 100 may be implemented to (i) transfer data from one clock domain to another clock domain and (ii) indicate when data is ready for further processing (e.g., valid) from one clock domain to another clock domain. In one example, the circuit 100 may be implemented integral to a synchronous digital application specific integrated circuit (ASIC), complex programmable logic device (CPLD) or field programmable gate array (FPGA) 101. However, the circuit 100 may be implemented in any appropriate logic and/or circuitry accordingly to meet the design criteria of a particular application.

The circuit 100 may have an input 102 that may receive a signal (e.g., CLKA_IN), an input 104 that may receive a signal (e.g., ENABLE), an input 106 that may receive a signal (e.g., CLKB), an output 108 that may present a signal (e.g., DATA_B), and an output 110 that may present a signal (e.g., READY_B). The signal CLKA_IN may be a first logic domain (e.g., a CLKA domain) clock signal. The signal ENABLE may be a control signal. The signal CLKB may be a second logic domain (e.g., a CLKB domain) clock signal. The signal DATA_B may be an n-bit wide digital data signal, where n is an integer. The signal DATA_B may be data that has been transferred from the first logic domain and synchronized to the second logic domain. The signal READY_B may be an indicator signal that may indicate when the signal DATA_B is valid (e.g., phase matched to the clock signal CLKB, synchronized, and/or ready for further processing).

The circuit 100 generally comprises a circuit 120 and a circuit 122. The circuit 120 may be implemented in the first logic domain (e.g., the CLKA domain). The circuit 122 may be implemented in the second logic domain (e.g., the CLKB domain). The circuit 120 may have an input that may receive the signal CLKA_IN, an input that may receive the signal ENABLE, an output that may present a signal (e.g., DATA_A), and an output that may present a signal (e.g., READY_A). The signal DATA_A may be an n-bit wide digital data signal. The signal READY_A may be an indicator signal that may indicate when the signal DATA_A is valid and/or ready for further processing (e.g., transfer from the CLKA domain to the CLKB domain). The circuit 122 may have an input that may receive the signal CLKB, an input that may receive the signal DATA_A, an input that may receive the signal READY_A, an output that may present the signal DATA_B, and an output that may present the signal READY_B.

The two logic domain clock signals CLKA_IN and CLKB may operate at the same frequency (e.g., the signals CLKA_IN and CLKB may relate to a base clock). However, the two logic domain clock signals CLKA_IN and CLKB may operate with a different phase relationship (e.g., out of phase with each other). The signal ENABLE is generally asserted and de-asserted via logic and/or circuitry external to the circuit 100.

The present invention may comprise an architecture and/or method to indicate in the CLKB clock domain that data is ready in the CLKA clock domain and has been registered in the CLKB domain. The signal DATA_A is generally the data that is synchronized into the CLKB domain. The signal CLKA_IN is generally gated in response to the signal ENABLE. The circuit 100 generally does not toggle the signal DATA_A (e.g., transfer/read in new data) for every cycle of the clock signal CLKA_IN. When the READY_B signal is at a logical HIGH (e.g., 1 or "on") state, the synchronized data in the CLKB clock domain (e.g., the signal DATA_B) is generally valid and/or ready for further processing.

Figure 2:
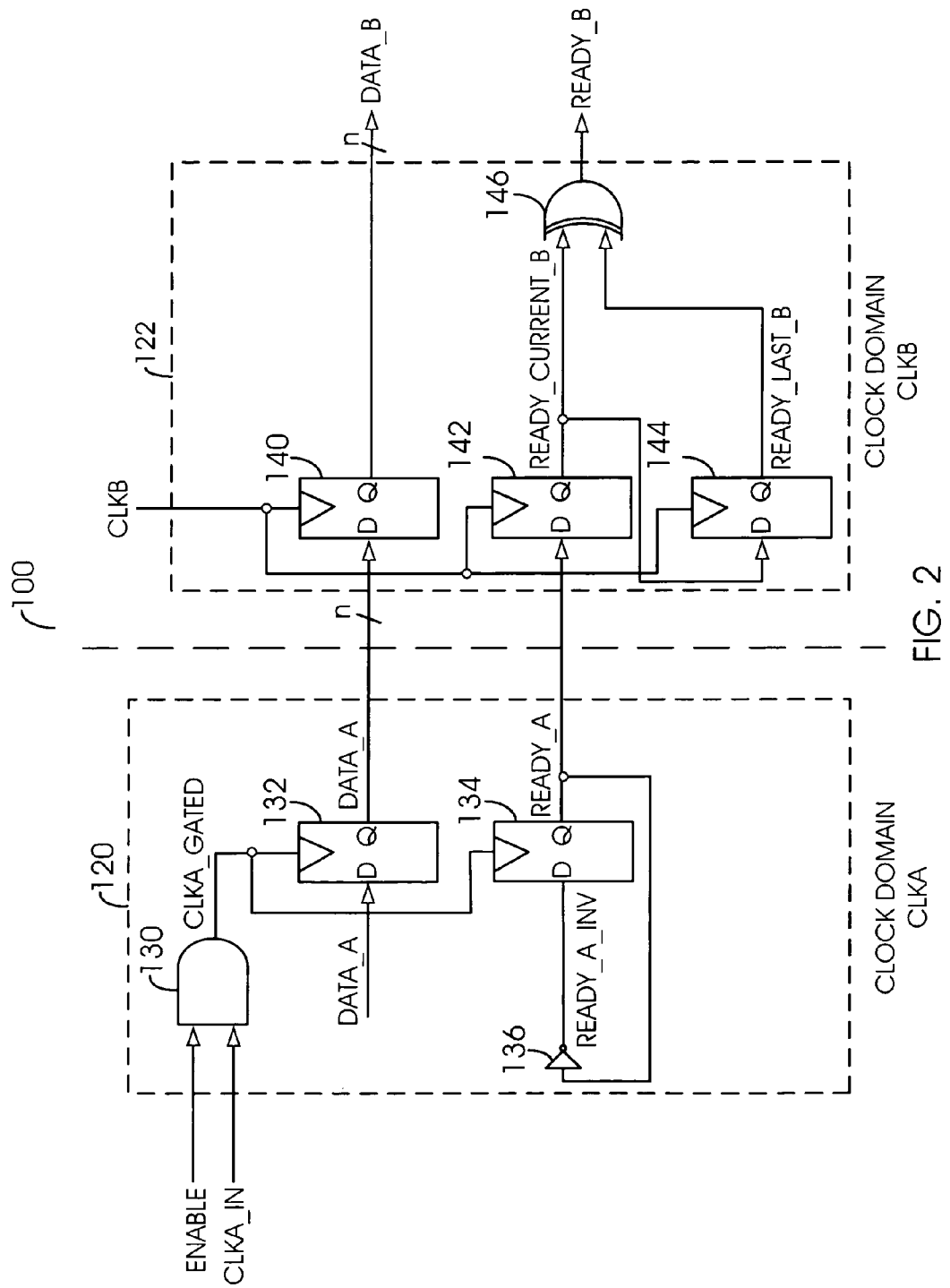
FIG. 2 is a detailed block diagram of the circuit of FIG. 1.

Referring to FIG. 2, a detailed block diagram illustrating the circuit 100 is shown. The circuit 120 may comprise a device 130, a circuit (or device) 132, a circuit (or device) 134, and a device 136. The device 130 may be implemented as a logic gate. In one example, the device 130 may be implemented as an AND gate. However, other logic gates may be implemented accordingly to meet the design criteria of a particular application. The circuits (or devices) 132 and 134 may be implemented as registers. In one example, the circuits 132 and 134 may be implemented as D-type flip-flop circuits. However, other appropriate register circuits may be implemented accordingly to meet the design criteria of a particular application. The circuit 136 may be implemented as an inverting amplifier (e.g., an inverter).

The device 130 may have a first input that may receive the signal CLKA_IN, a second input that may receive the signal ENABLE, and an output that may present a signal (e.g., CLKA_GATED). The device 130 may be configured to gate the signal CLKA_IN in response to the signal ENABLE. The signal CLKA_GATED may be a gated version of the signal CLKA_IN. The device 130 may be configured to generate the signal CLKA_GATED in response to the signals CLKA_IN and ENABLE.

The circuit 132 may have an input (e.g., a clock input) that may receive the signal CLKA_GATED, an input (e.g., a "D" input) that may receive the signal DATA_A, and an output (e.g., a "Q" output) that may present the signal DATA_A. The circuit 132 may be implemented as a storage register that may clock in (toggle) and store (e.g., hold) the signal DATA_A in the CLKA logic domain. The circuit 132 may be configured to clock in and present the signal DATA_A in response to the signal CLKA_GATED.

The circuit 134 may have an input (e.g., a clock input) that may receive the signal CLKA_GATED, an input (e.g., a "D" input) that may receive a signal (e.g., READY_A_INV), and an output (e.g., a "Q" output) that may present the signal READY_A. The signal READY_A_INV may be a digital complement (e.g., inverse) of the signal READY_A. The circuit 136 may have an input that may receive the signal READY_A and an output that may present the signal READY_A_INV. The circuit 134 may be configured to generate the signal READY_A in response to the signals CLKA_GATED and READY_A_INV. The circuit 134 may be configured to toggle for each cycle of the clock signal CLKA_GATED (e.g., when new data is clocked into the circuit 132).

The circuit 122 may comprise a circuit (or device) 140, a circuit (or device) 142, a circuit (or device) 144, and a device 146. The circuits (or devices) 140, 142, and 144 may be implemented as registers. In one example, the circuits 140, 142 and 144 may be implemented as D-type flip-flop circuits. However, other appropriate register circuits may be implemented accordingly to meet the design criteria of a particular application. The device 146 may be implemented as a logic gate. In one example, the device 146 may be implemented as an EXCLUSIVE-OR gate. However, any appropriate logic gate may be implemented to meet the design criteria of a particular application.

The circuit 140 may have an input (e.g., a clock input) that may receive the signal CLKB, an input (e.g., a "D" input) that may receive the signal DATA_A, and an output (e.g., a "Q" output) that may present the signal DATA_B. The signal DATA_B may be the CLKA domain signal DATA_A clocked into the CLKB domain. The circuit 140 may be implemented as a storage register that may store (e.g., hold) and present the signal DATA_B in the CLKB logic domain. The circuit 140 may be configured to clock in the signal DATA_A and present the synchronized signal DATA_B in response to the signals CLKB and DATA_A.

The circuit 142 may have an input (e.g., a clock input) that may receive the signal CLKB, an input (e.g., a "D" input) that may receive the signal READY_A, and an output (e.g., a "Q" output) that may present a signal (e.g., READY_CURRENT_B). The signal READY_CURRENT_B may be an intermediate indicator signal. The signal READY_CURRENT_B may be the CLKA domain signal READY_A clocked into the CLKB domain. The circuit 142 may be configured to clock in the signal READY_A and present the signal READY_CURRENT_B in response to the signals CLKB and READY_A.

The circuit 144 may have an input (e.g., a clock input) that may receive the signal CLKB, an input (e.g., a "D" input) that may receive the signal READY_CURRENT_B, and an output (e.g., a "Q" output) that may present a signal (e.g., READY_LAST_B). The signal READY_LAST_B may be an intermediate indicator signal. The signal READY_LAST_B may be the signal READY_CURRENT_B delayed by one cycle of the signal CLKB. The circuit 144 may be configured to generate the signal READY_LAST_B in response to the signals CLKB and READY_CURRENT_B.

The device 146 may have a first input that may receive the signal READY_CURRENT_B, a second input that may receive the signal READY_LAST_B, and an output that may present the signal READY_B. The device 146 may be configured to generate the signal READY_B in response to the signals READY_CURRENT_B and READY_LAST_B.

The signal READY_A may be clocked into the CLKB domain as the signal READY_CURRENT_B. The signal READY_LAST_B is generally the signal READY_CURRENT_B delayed by one cycle of the signal CLKB. The data ready indicator signal in the CLKB clock domain (e.g., the signal READY_B) may be generated via a logical EXCLUSIVE-OR of the READY_CURRENT_B and the READY_LAST_B signals. The signal READY_B may be a logical HIGH when the signal READY_CURRENT_B is different from the previous signal READY_CURRENT_B (e.g., the signal READY_LAST_B).

Figure 3:
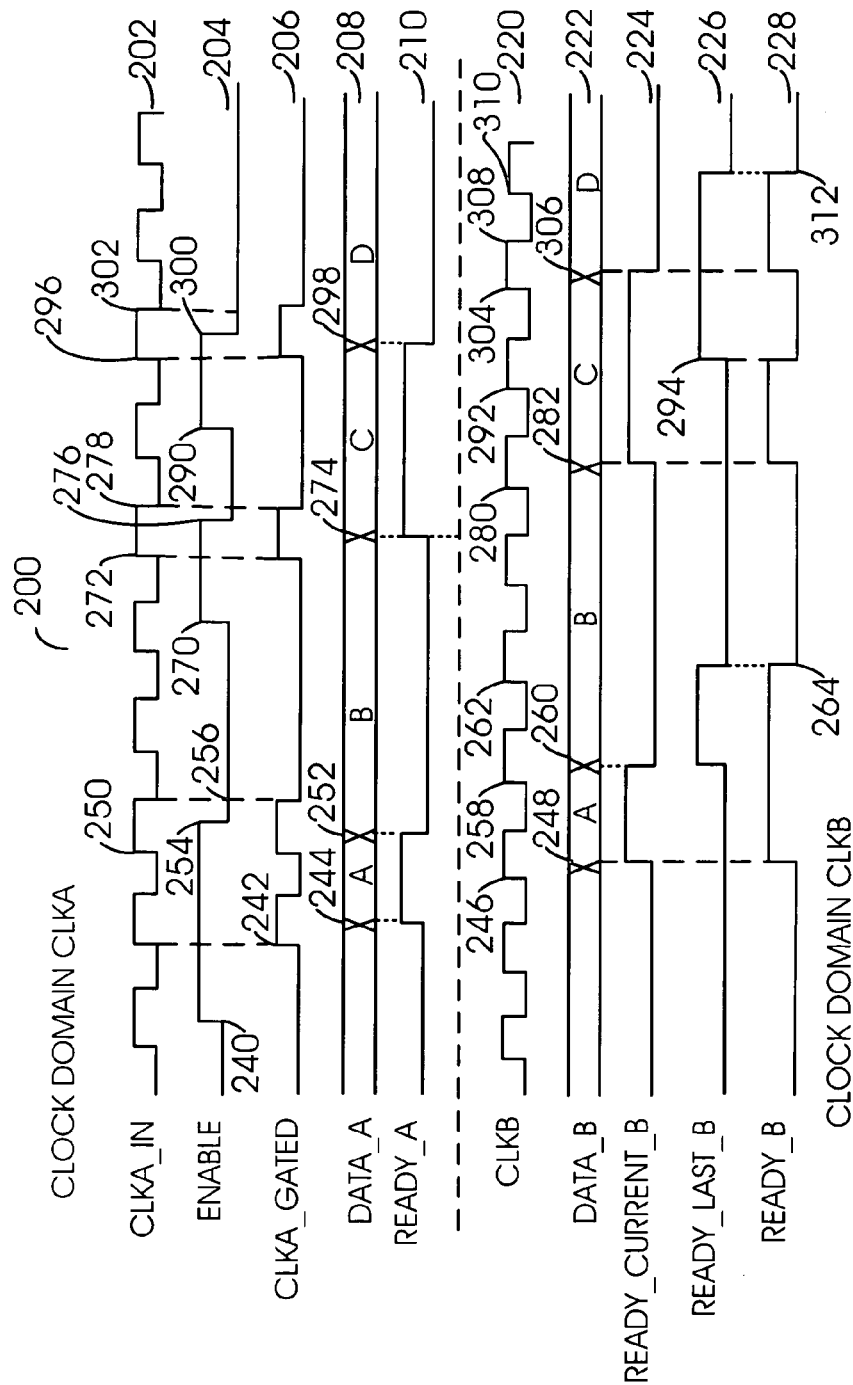
FIG. 3 is a timing diagram illustrating an operation of the present invention.

Referring to FIG. 3, a timing diagram 200 illustrating example waveforms of the circuit 100 is shown. In the CLKA logic domain, (i) a waveform 202 may be a waveform of the signal CLKA_IN, (ii) a waveform 204 may be a waveform of the signal ENABLE, (iii) a waveform 206 may be a waveform of the signal CLKA_GATED, (iv) a waveform 208 may be a waveform of the signal DATA_A, and (v) a waveform 210 may be a waveform of the signal READY_A. In the CLKB logic domain, (i) a waveform 220 may be a waveform of the signal CLKB, (ii) a waveform 222 may be a waveform of the signal DATA_B, (iii) a waveform 224 may be a waveform of the signal READY_CURRENT_B, (iv) a waveform 226 may be a waveform of the signal READY_LAST_B, and (v) a waveform 228 may be a waveform of the signal READY_B.

In one example operation, the signal ENABLE may be asserted (e.g., a logical HIGH) at a time 240. When the signal CLKA_IN cycles to a logical HIGH (e.g., a time 242), the signal CLKA_GATED may be generated as a logical HIGH. After a delay from the time 242 to a time 244, the signal DATA_A may be toggled to a value (e.g., A) and the signal READY_A may be generated as a logical HIGH. The signal ENABLE may remain asserted as a logical HIGH.

When the signal CLKB is asserted as a logical HIGH (e.g., a time 246) and after a delay to a time 248 (i) the value of the signal DATA_A (e.g., A) may be clocked into the CLKB logic domain as the signal DATA_B and (ii) the signal READY_A may be clocked into the CLKB logic domain as the signal READY_CURRENT B. The signal READY_B may be generated and presented at a logical HIGH state. The delay from the time 242 to the time 244 may be a latency in the circuits 120 and 122. The delay from the time 246 to the time 248 may be equal to the delay from the time 242 to the time 244. The signal CLKA_IN may cycle to a logical HIGH at a time 250. After a delay to a time 252, the signal DATA_A may be toggled to a new value (e.g., B). The signal READY_A may be de-asserted (e.g., a logical LOW). The delay from the time 250 to the time 252 may be equal to the delay from the time 242 to the time 244.

The signal ENABLE may be de-asserted at a time 254. When the signal CLKA_IN cycles to a de-asserted state (e.g., a time 256), the signal CLKA_GATED may be de-asserted. When the signal CLKB cycles to a logical HIGH (e.g., a time 258) and after a delay to a time 260, (i) the signal DATA_B may be clocked to the value B, (ii) the signal READY_CURRENT_B may be de-asserted, and (iii) the signal READY_LAST_B may be generated as a logical HIGH. The delay from the time 258 to the time 260 may be equal to the delay from the time 242 to the time 244. When the signal CLKB next cycles to a logical HIGH (e.g., a time 262) and after a delay to a time 264, the signals READY_LAST_B and READY_B may be de-asserted. The delay from the time 262 to the time 264 may be equal to the delay from the time 242 to the time 244.

In another example operation, the signal ENABLE may be asserted at a time 270. When the signal CLKA_IN cycles to a logical HIGH (e.g., a time 272), the signal CLKA_GATED may be generated as a logical HIGH. After a delay from the time 272 to a time 274, the signal DATA_A may be toggled to a new value (e.g., C) and the signal READY_A may be generated as a logical HIGH. The delay from the time 272 to the time 274 may be equal to the delay from the time 242 to the time 244.

The signal ENABLE may be de-asserted at a time 276. When the signal CLKA_IN cycles to a de-asserted state (e.g., a time 278), the signal CLKA_GATED may be de-asserted. When the signal CLKB cycles to a logical HIGH (e.g., a time 280) and after a delay to a time 282, (i) the signal DATA_B may be clocked to the value C, (ii) the signal READY_A may be clocked into the CLKB logic domain as the signal READY_CURRENT_B, and (iii) the signal READY_B may be generated as a logical HIGH. The delay from the time 280 to the time 282 may be equal to the delay from the time 242 to the time 244.

The signal ENABLE may be re-asserted as a logical HIGH at a time 290. The signal CLKB may cycle to a logical HIGH at a time 292. After a delay to a time 294, the signal READY_LAST_B may be generated as a logical HIGH and the signal READY_B may be de-asserted. The delay from the time 292 to the time 294 may be equal to the delay from the time 242 to the time 244. The signal CLKA_IN may cycle to a logical HIGH at a time 296. The signal CLKA_GATED may be generated as a logical HIGH. After a delay to a time 298, the signal DATA_A may be toggled to a new value (e.g., D) and the signal READY_A may be de-asserted. The delay from the time 296 to the time 298 may be equal to the delay from the time 242 to the time 244.

The signal ENABLE may be de-asserted at a time 300. At a time 302 the signal CLKA_IN may cycle to a de-asserted state and the signal CLKA_GATED may be de-asserted. The signal CLKB may cycle to a logical HIGH at a time 304. After a delay to a time 306 the value of the signal DATA_A (e.g., D) may be clocked into the CLKB domain as the signal DATA_B. The signal READY_CURRENT_B may be de-asserted and the signal READY_B may be generated as a logical HIGH. The delay from the time 304 to the time 306 may be equal to the delay from the time 242 to the time 244. The signal CLKB may cycle to a de-asserted state at a time 308 and to a logical HIGH state at a time 310. After a delay to a time 312, the signals READY_LAST_B and READY_B may be de-asserted.

The present invention may be analyzed using static timing analysis (STA). The use of STA may reduce the time and cost required for simulation, prototyping, debugging, etc. of the logic and/or circuitry where the present invention is implemented when compared to conventional clock domain to clock domain indicator circuits. The present invention may be implemented having an enable signal for only one of the clock domains. The present invention may have increased bandwidth and minimal latency when compared to conventional clock domain to clock domain indicator circuits. Timing specifications for the enable signal for the single domain may be less critical when compared to conventional circuits where an enable signal is implemented for two or more clock domains.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

The present invention may also be implemented by the preparation of CPLDs, FPGAs, or by interconnecting an appropriate network of conventional component circuits, as is described herein, modifications of which will be readily apparent to those skilled in the art(s).

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to present a first data signal and a first indicator signal in response to a first clock signal and an enable signal; and
   a second circuit configured to present a second data signal and a second indicator signal in response to said first data signal, said first indicator signal and a second clock signal, wherein said second circuit comprises (i) a first register circuit configured to generate said second data signal in response to said second clock signal and said first data signal, (ii) a second register circuit configured to generate a first intermediate indicator signal in response to said second clock signal and said first indicator signal, (iii) a third register circuit configured to generate a second intermediate indicator signal in response to said second clock signal and said first intermediate indicator signal and (iv) a logic gate configured to generate said second indicator signal in response to said first and second intermediate indicator signals.

2. The apparatus according to claim 1, wherein (i) said first, second, and third register circuits comprise D-type flip-flop circuits and (ii) said logic gate comprises an EXCLUSIVE-OR gate.

3. An apparatus comprising:
   a first circuit configured to present a first data signal and a first indicator signal, wherein said first circuit comprises a first register circuit configured to store and present said first data signal in response to a rated version of a first clock signal and a second register circuit configured to complement said first indicator signal in response to said rated version of said first clock signal; and
   a second circuit configured to present a second data signal and a second indicator signal in response to said first data signal, said first indicator signal and a second clock signal.

4. The apparatus according to claim 3, wherein said first indicator signal indicates when said first data signal is valid and said second indicator signal indicates when said second data signal is valid.

5. The apparatus according to claim 3, wherein said first clock signal comprises a first logic domain clock signal and said second clock signal comprises a second logic domain clock signal.

6. The apparatus according to claim 5, wherein (i) said apparatus is configured to synchronize said second data signal to said second logic domain and (ii) said second data signal comprises said first data signal synchronized to said second domain.

7. The apparatus according to claim 3, wherein said first and second clock signals operate at the same frequency.

8. The apparatus according to claim 3, wherein said first and second clock signals operate out of phase with each other.

9. The apparatus according to claim 3, wherein (i) said first circuit is configured to store said first data signal until a new data signal is received and (ii) said second circuit is configured to store said second data signal until said second circuit receives said first data signal.

10. The apparatus according to claim 3, wherein said first circuit further comprises:
    a logic gate configured to (i) receive said first clock signal and an enable signal and (ii) present said gated version of said first clock signal.

11. The apparatus according to claim 3, wherein said second circuit comprises:
    a first register circuit configured to generate a first intermediate indicator signal in response to said second clock signal and said first indicator signal;
    a second register circuit configured to generate a second intermediate indicator signal in response to said second clock signal and said first intermediate indicator signal; and
    a logic gate configured to generate said second indicator signal in response to said first and second intermediate indicator signals.

12. The apparatus according to claim 10, wherein (i) said logic gate comprises an AND gate and (ii) said first and second register circuits comprise D-type flip-flop circuits.

13. The apparatus according to claim 3, wherein said apparatus is implemented integral to a member selected from a group consisting of an application specific integrated circuit, a CPLD and a FPGA.

14. The apparatus according to claim 3, wherein said first and second data signals comprise n-bit wide digital signals, where n is an integer.

15. A method of indicating data is synchronized from a first logic domain to a second logic domain comprising the steps of:
    (A) presenting a first data signal and a first indicator signal in response to a rated clock signal, wherein said gated clock signal is generated in response to a first clock signal and an enable signal and said first indicator signal is complemented in response to said gated clock signal; and
    (B) presenting a second data signal and a second indicator signal in response to said first data signal, said first indicator signal and a second clock signal.

16. The method according to claim 15, wherein said first clock signal comprises a clock signal of said first logic domain and said second clock signal comprises a clock signal of said second logic domain.

17. The method according to claim 15, wherein said method further comprises the step of operating said first and second clock signals at the same frequency.

18. The method according to claim 15, wherein said method further comprises the step of operating said first and second clock signals out of phase with each other.

19. The method according to claim 15, wherein said method comprises the step of implementing said method in a member of a group consisting of an application specific integrated circuit, a CPLD and a FPGA.

20. The method according to claim 15, wherein said first and second data signals comprise n-bit wide digital data signals, where n is an integer.

21. The apparatus according to claim 3, wherein said second circuit comprises:
    a register circuit configured to generate said second data signal in response to said second clock signal and said first data signal.

* * * * *